(12) United States Patent
Lee et al.

(10) Patent No.: US 11,618,716 B2
(45) Date of Patent: Apr. 4, 2023

(54) MANUFACTURING METHOD OF DIELECTRIC CERAMIC COMPOSITION AND DIELECTRIC CERAMIC COMPOSITION MANUFACTURED BY THE SAME

(71) Applicant: SAMSUNG ELECTRO-MECHANICS CO., LTD., Suwon-si (KR)

(72) Inventors: Chang Geon Lee, Suwon-si (KR); Hae Suk Chung, Suwon-si (KR); Yoon Soo Park, Suwon-si (KR); Dong Jun Jung, Suwon-si (KR); Yun Jung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 46 days.

(21) Appl. No.: 16/836,143

(22) Filed: Mar. 31, 2020

(65) Prior Publication Data

US 2021/0188713 A1 Jun. 24, 2021

(30) Foreign Application Priority Data

Dec. 18, 2019 (KR) .......................... 10-2019-0169620

(51) Int. Cl.
| | |
|---|---|
| *C04B 35/468* | (2006.01) |
| *H01G 4/12* | (2006.01) |
| *C04B 35/628* | (2006.01) |
| *C04B 35/64* | (2006.01) |
| *H01G 4/012* | (2006.01) |

(Continued)

(52) U.S. Cl.
CPC ........ *C04B 35/4682* (2013.01); *C04B 35/628* (2013.01); *C04B 35/64* (2013.01); *H01G 4/1209* (2013.01); *C04B 2235/3224* (2013.01); *C04B 2235/3236* (2013.01); *C04B 2235/3241* (2013.01); *C04B 2235/3263* (2013.01); *C04B 2235/3418* (2013.01); *C04B 2235/442* (2013.01); *C04B 2235/5445* (2013.01); *C04B 2235/656* (2013.01); *C04B 2235/768* (2013.01);

(Continued)

(58) Field of Classification Search
None
See application file for complete search history.

(56) References Cited

U.S. PATENT DOCUMENTS

| | | | |
|---|---|---|---|
| 5,011,804 | A | 4/1991 | Bergna et al. |
| 5,155,072 | A | 10/1992 | Bruno et al. |

(Continued)

FOREIGN PATENT DOCUMENTS

| | | |
|---|---|---|
| CN | 103547548 A | 1/2014 |
| CN | 108063051 A | 5/2018 |

(Continued)

OTHER PUBLICATIONS

Office Action issued in corresponding Chinese Patent Application No. 202010580066.8 dated Jan. 28, 2023, with English translation.

*Primary Examiner* — Ronak C Patel

(74) *Attorney, Agent, or Firm* — Morgan, Lewis & Bockius LLP

(57) ABSTRACT

A manufacturing method of a dielectric ceramic composition includes attaching a reactive functional group to a surface of a base material powder particle of a perovskite structure.

2 Claims, 4 Drawing Sheets

(51) Int. Cl.
   *H01G 4/248* (2006.01)
   *H01G 4/30* (2006.01)
(52) U.S. Cl.
   CPC ............ *H01G 4/012* (2013.01); *H01G 4/248* (2013.01); *H01G 4/30* (2013.01); *Y10T 428/2991* (2015.01)

(56) References Cited

U.S. PATENT DOCUMENTS

| | | | |
|---|---|---|---|
| 2012/0034528 A1* | 2/2012 | Wendman | H01M 10/056 429/300 |
| 2012/0245016 A1 | 9/2012 | Curry et al. | |
| 2013/0062578 A1 | 3/2013 | Park et al. | |
| 2014/0240896 A1* | 8/2014 | Morigasaki | H01G 4/1227 361/301.4 |
| 2015/0083978 A1 | 3/2015 | Park et al. | |
| 2018/0130601 A1 | 5/2018 | Kim et al. | |
| 2018/0182557 A1* | 6/2018 | Park | H01L 28/40 |
| 2018/0211779 A1* | 7/2018 | Hirose | C04B 35/62645 |
| 2018/0211780 A1* | 7/2018 | Hirose | C04B 35/462 |
| 2020/0111616 A1 | 4/2020 | Choi et al. | |

FOREIGN PATENT DOCUMENTS

| | | |
|---|---|---|
| JP | S64-61354 A | 3/1989 |
| JP | 2000-173854 A | 6/2000 |
| JP | 2007-001823 A | 1/2007 |
| JP | 2011-176184 A | 9/2011 |
| JP | 2013-163614 A | 8/2013 |
| JP | 2018-139261 A | 9/2018 |
| KR | 10-2019-0121191 A | 10/2019 |

\* cited by examiner

'B'

MANUFACTURING METHOD OF DIELECTRIC CERAMIC COMPOSITION AND DIELECTRIC CERAMIC COMPOSITION MANUFACTURED BY THE SAME

CROSS-REFERENCE TO RELATED APPLICATION(S)

This application claims benefit of priority to Korean Patent Application No. 10-2019-0169620 filed on Dec. 18, 2019 in the Korean Intellectual Property Office, the disclosure of which is incorporated herein by reference in its entirety.

TECHNICAL FIELD

The present disclosure relates to a manufacturing method of a dielectric ceramic composition and to a dielectric ceramic composition manufactured using the same.

BACKGROUND

Electronic components using ceramic materials such as capacitors, inductors, piezoelectric elements, varistors, thermistors, or the like, include a ceramic body formed of a ceramic material, an internal electrode formed inside the body, and an external electrode provided on the surface of the ceramic body to be connected to the internal electrode. In recent years, as an application field of such electronic components has expanded, demand for high reliability in addition to miniaturization, ultra-thinning, and ultra high capacity in electronic components has increased.

Such electronic components use various dielectric materials as main raw materials, and thereamong, a dielectric ceramic composition having a perovskite structure is used in various fields. The dielectric ceramic composition may be manufactured by a solid-phase reaction method, an oxalate method, a hydrothermal synthesis method, and the like, and thereamong, the solid-phase reaction method has been usefully used for manufacturing a dielectric composition applied to a relatively thick sheet, but there may be a problem in which a large amount of agglomeration occurs in a dispersion process using a bead mill, or the like, and a difference in a dispersion degree occurs depending on a type of additives and a grain growth is unbalanced.

In order to solve the problem of the solid-phase method, a ceramic powder may be dispersed and slurryed on an aqueous solution of metal, a liquid precipitation method for adjusting pH, or a ceramic powder may be dispersed and slurryed on an organic acid aqueous solution to which a water-soluble salt is added, a spray drying method, or the like have been proposed, and there are limitations in that an additive component does not precipitate uniformly, an anion component remains as an impurity, an additive component is easily separated from a dielectric powder, or the like.

SUMMARY

An aspect of the present disclosure is to provide a manufacturing method of a dielectric ceramic composition and a dielectric ceramic composition capable of uniformly dispersing subcomponents.

Another aspect of the present disclosure is to provide a manufacturing method of a dielectric ceramic composition and a dielectric ceramic composition having a uniform concentration gradient up to a final product by improving dispersion stability.

Another aspect of the preset disclosure is to provide a manufacturing method of a dielectric ceramic composition and a dielectric ceramic composition having excellent electrical properties such as a dielectric constant, a high-temperature withstand voltage, and the like, by making solid solubility of a subcomponent uniform.

According to an embodiment of the present disclosure, a manufacturing method of a dielectric ceramic composition including a step of attaching a reactive functional group to a surface of a base material powder particle of a perovskite structure may be provided.

According to another embodiment of the present disclosure, a dielectric ceramic composition may include abase material powder particle of a perovskite structure; and a diffusion type additive. The dielectric ceramic composition in which a concentration peak layer of the diffusion type additive is present at a depth of 0.8 nm to 8.5 nm from the surface of the base material powder particle.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
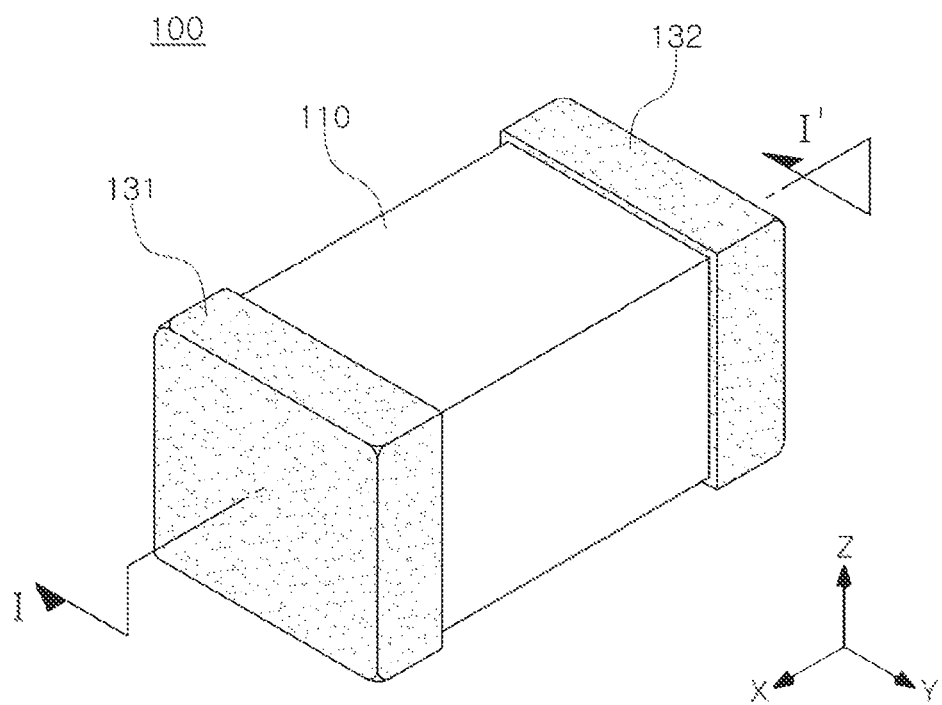
FIG. 1 is a schematic perspective view illustrating an electronic component according to an embodiment of the present disclosure.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

The present disclosure relates to a dielectric ceramic composition, and examples of the electronic component including the dielectric ceramic composition may include capacitors, inductors, piezoelectric elements, varistors, thermistors, or the like.

Figure 2:
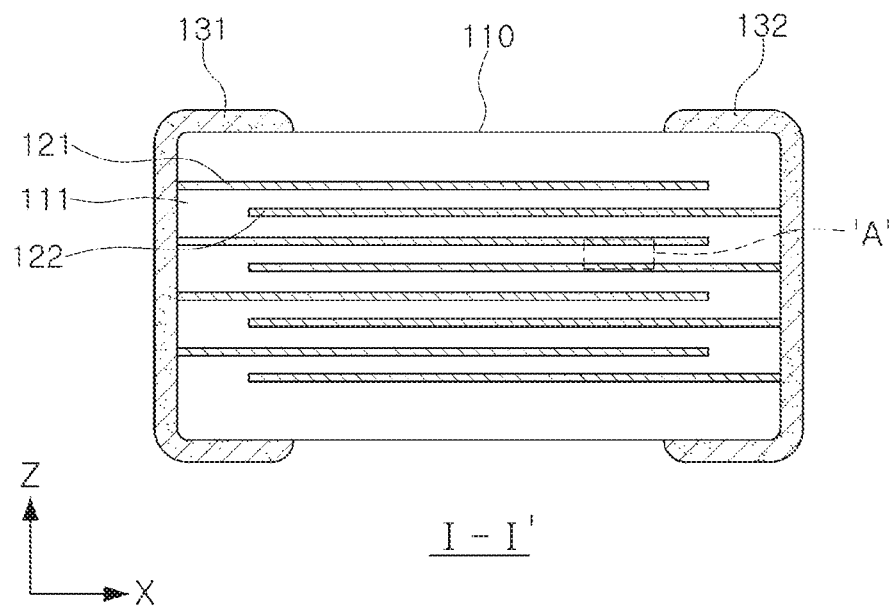
FIG. 2 is a cross-sectional view taken along line I-I' of FIG. 1.
Figure 3:
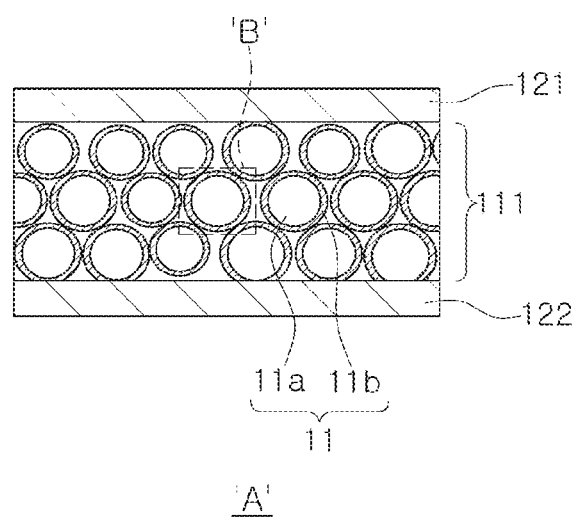
FIG. 3 is an enlarged view of region A of FIG. 2.
Figure 4:
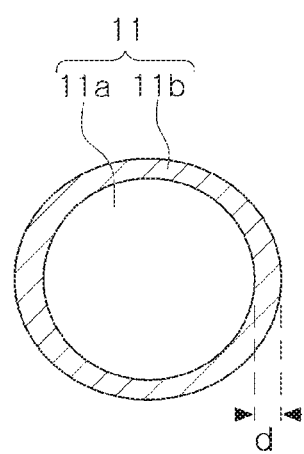
FIG. 4 is an enlarged view of region B of FIG. 3.

FIG. 1 is a schematic perspective view illustrating an electronic component, a capacitor as one of the examples including the dielectric ceramic composition according to an embodiment of the present disclosure. FIG. 2 is a cross-sectional view taken along line I-I' of FIG. 1. FIG. 3 is an enlarged view of region A of FIG. 2. FIG. 4 is an enlarged view of region B of FIG. 3.

Referring to FIGS. 1-4, a multilayer ceramic capacitor 100 according to an embodiment includes a ceramic body 110, a plurality of internal electrodes 121 and 122 formed in the ceramic body 110, and external electrodes 131 and 132 formed on external surfaces of the ceramic body 110.

The shape of the ceramic body 110 is not particularly limited, but may be a rectangular parallelepiped shape as illustrated in the drawings.

Ends of the plurality of internal electrodes 121 and 122 formed in the ceramic body 110 are exposed from opposing surfaces the ceramic body 110 in a length (X) direction.

The first and second external electrodes 131 and 132 may be formed on the opposing surfaces in the length direction to be electrically connected to the internal electrodes 121 and 122, respectively.

A dielectric ceramic composition included in the dielectric layer 111 may be formed from a base material powder particle 11 having a perovskite structure 11a and a diffusion type additive 11b. A depth d of the diffusion type additive 11b may be 0.8 nm to 8.5 nm from the surface of the base material powder particle 11.

A manufacturing method of a dielectric ceramic composition according to an embodiment of the present disclosure may include a step of attaching a reactive functional group to a surface of a base material powder particle of a perovskite structure. In the present specification, the "perovskite structure" may have a structure of $ABX_3$ (where A and B are cations and X is an anion), and it may mean a structure in which the A cation coordinates with 12 X anions to form a cubic octahedral structure and B cation is bonding to six X anions with an octahedral structure. In the present specification, the "reactive functional group" may mean an atomic group of an organic compound imparting properties to a compound, and may mean a functional group capable of bonding to other compounds. The bonding may be a concept including ion defects, covalent bonding, and/or hydrogen bonding.

In general, in order to disperse an additive in a base material powder particle having a perovskite structure, it is known that it is preferable that a surface of the base material powder particle is electrically neutral. This is because when the surface of the base material powder particle is not electrically neutral, it is difficult to form a uniform dispersion according to electronegativity of the additive, and in some cases, a side reaction, proceeding during a calcinations process, may occur. In a manufacturing method of the dielectric ceramic composition according to the present disclosure, on a contrary to the above-described problem, through a step of attaching a reactive functional group to the surface of the base material powder particle, a component requiring a solid solution may be coated on the surface of the base material powder particle, thereby improving dispersibility of an entire composition.

In an example of the present disclosure, the dielectric ceramic composition according to the present disclosure may include at least one or more of $(Ba_{1-x}Ca_x)_m(Ti_{1-y}Zr_y)O_3$, $PbTiO_3$ and $SrTiO_3$ ($0 \leq x \leq 1$, $0.995 \leq m \leq 1.010$, $0 \leq y \leq 1$) as a base material powder particle.

The base material powder particle may be $(Ba_{1-x}Ca_x)TiO_3$, $(Ba_{1-x}Ca_x)(Ti_{1-y}Zr_y)O_3$, $Ba(Ti_{1-y}Zr_y)O_3$ ($0 \leq x \leq 1$, $0.995 \leq m \leq 1.010$, $0 \leq y \leq 1$, formed such that Ca and Zr are partially dissolved in $BaTiO_3$, and when the x is 1 and the y is 1, the base material powder particle may be $BaTiO_3$.

In addition, the base material powder particle may be $PbTiO_3$ and/or $SrTiO_3$, but is not limited thereto. The base material powder particle is not particularly limited, but considering a particle size of a final composition, an average particle size may be in a range of 50 nm to 1000 nm.

In the present embodiment, the reactive functional group attached to the surface of the base material powder particle may be an epoxy group, an amino group, a hydroxyl group, a carboxyl group, a (meth) acryloyl group and/or a (meth) acryloyloxy group. The reaction functional group may induce rapid diffusion and solid solution of the diffusion type additive described later including atoms having a high electronegativity. In particular, when the base material powder particle and the diffusion type additive are manufactured and dispersed in an aqueous slurry as described below, the dispersion stability may be improved and uniform dispersibility may be maintained.

A method of attaching the reactive functional group to the surface of the base material powder particle is not particularly limited. For example, the base material powder particle may be precipitated in an aqueous solution or an organic solvent in which a compound having a reactive functional group is dissolved to modify the surface of the base material powder particle, or first, a group may be attached to the surface of the base material powder particle by a chemical treatment, or the like, and then a method of reacting with a compound having another reactive functional group may be used, but is not limited thereto.

In an embodiment of the present disclosure, after attaching the reactive functional group to the surface of the base material powder particle, a step of drying it may be selectively included. The drying is for facilitating storage, transportation, and/or post-treatment of the base material powder particle in which the surface thereof is modified, and drying methods, drying conditions, or the like are not particularly limited. However, in order to prevent decomposition or removal of the reactive functional group attached to the surface of the base material powder particle, it may be more preferable to dry at a temperature of 300° C. or less, 250° C. or less, or 200° C. or less.

A manufacturing method of a dielectric ceramic composition according to an embodiment of the present disclosure may include a step of mixing a base material powder particle to which a reactive functional group is attached and a diffusion type additive. In the mixing step, both dry and wet mixing may be used. For example, in the case of wet mixing, the surface-treated base material powder particle and the diffusion type additive may be manufactured in an aqueous slurry, respectively, and then mixed. In this case, the diffusion type additive may be in a form of a hydroxide and/or a water-soluble salt. The mixing step may be a step of dispersing the diffusion type additive into the base material powder particle through mechanical milling using a ball mill, a bead mill, or the like.

In the manufacturing method of the dielectric ceramic composition according to the present disclosure, the additive may refer all components other than the base material powder particle, and may be a concept including both a diffusion type additive and a non-diffusion type additive.

The diffusion type additive may include a first subcomponent and a second subcomponent, and may be a component of forming a base material powder particle and a solid solution in a subsequent process. In addition, the non-diffusion type additive may include a third subcomponent.

Hereinafter, components of the additive of the dielectric ceramic composition according to an embodiment of the present disclosure will be described in more detail.

a) First Subcomponent

According to an embodiment of the present disclosure, in a manufacturing method of a dielectric ceramic composition, a diffusion-type additive may include a first subcomponent including one or more selected from a group consisting of Y, Dy, Ho, Er, Gd, Ce, Nd, Sm, Tb, Tm, La, Yb, oxides thereof, and carbonates thereof.

The first subcomponent may be included in a range of 1.0 to 3.0 mol % based on the base material powder particle. In the present specification, "x mol % included" of any component with respect to a base material powder particle may mean that x mole part is included with respect to 100 moles of the base material powder particle. A content of the first subcomponent may be based on a content of at least one or more elements of Y, Dy, Ho, Er, Gd, Ce, Nd, Sm, Tb, Tm, La and Yb included in the first subcomponent without distinguishing an addition form such as an oxide or a carbonate. For example, a sum of the contents of at least one or more elements of Y, Dy, Ho, Er, Gd, Ce, Nd, Sm, Tb, Tm, La and Yb included in the first subcomponent may be 1.0 mole parts or more, 1.1 mole parts or more, 1.2 mole parts or more, 1.3 mole parts or more, 1.4 mole parts or more or 1.5 mole parts or more, and may be 3.0 mole parts or less, 2.9 mole parts or less, 2.8 mole parts or less, 2.7 mole parts or less, 2.6 mole parts or less, or 2.5 mole parts or less, with respect to 100 mole parts of the base material main ingredient.

The first subcomponent may diffuse into the dielectric ceramic composition according to the present disclosure, and may be dissolved in a predetermined depth, and may serve to prevent reliability of an electronic component to which the dielectric ceramic composition according to the present disclosure is applied from being degraded. When the first subcomponent is out of the above-described range, high-temperature withstand voltage characteristics may be degraded.

b) Second Subcomponent

According to another embodiment of the present disclosure, in a method of manufacturing of a dielectric ceramic composition of the present disclosure, a diffusion-type additive may include a second subcomponent including one or more selected from a group consisting of Mg, Li, Ti, Cr, Mn, Fe, Co, Ni, Cu, Zn, Sr, Zr, Ru, Rh, Pd, Ag, Cd, In, Sn, Sb, Ta, W, Pb, Bi, V, Nb, B, an oxide thereof, and a carbonate thereof. In this case, three or more of the second subcomponent may be included.

The second subcomponent may serve to improve reduction resistance properties of the dielectric ceramic composition and to improve high-temperature withstand voltage characteristics of the electronic component to which the dielectric ceramic composition is applied.

The second subcomponent may be included in a range of 1.0 to 1.5 mol % based on the base material powder particle. A content of the second subcomponent may be based on a total content of elements included in the second subcomponent without distinguishing an addition form such as an oxide or a carbonate. For example, a sum of the contents of the elements of the second subcomponent may be 1.00 mole parts or more, 1.05 mole parts or more or 1.15 mole parts or more, and may be 1.5 mole parts or less, 1.45 mole parts or less, 1.40 mole parts or less or 1.35 mole parts or less.

The second subcomponent may be diffused and dissolved in the dielectric ceramic composition according to the present disclosure, and when a total content of the second subcomponent is out of the above-range, a dielectric constant of the dielectric ceramic composition according to the present disclosure may be lowered, and high-temperature withstand voltage characteristics of the electronic component to be manufactured may be degraded.

c) Third Subcomponent

According to another embodiment of the present disclosure, in a manufacturing method of a dielectric ceramic composition of the present disclosure, a non-diffusion-type additive may include a third subcomponent including one or more selected from a group consisting of Si, Ba, Al, Ca, an oxide thereof, a carbonate thereof, and glass including thereof.

The third subcomponent may serve to forma liquid-phase at a low-temperature at an initial stage of sintering of the dielectric ceramic composition according to the present disclosure to help the sintering and to rearrange the base material powder particle and the diffusion-type additive.

However, since the third subcomponent may inhibit a reaction between the first and second subcomponents and the base material powder particle described above in a final firing process, the third subcomponent is added to the manufacturing method of the dielectric ceramic composition according to the present disclosure after removing the reactive functional group as described below.

The third subcomponent may be included in a range of 0.5 to 5.0 mol % with respect to the base material powder particle. A content of the third subcomponent may be based on the content of at least one or more of Si, Ba, Al and Ca included in the third subcomponent without distinguishing an addition form such as an oxide, a carbonate, or glass. For example, a sum of the contents of at least one or more elements of Si, Ba, Al and Ca included in the third subcomponent may be 0.5 to 5.0 mole parts with respect to the 100 mol parts of the base material powder particle.

When the content of the third subcomponent is out of the range, problems such as lowering of sinterability, lowering of density, and secondary phase generation, and the like, when the dielectric ceramic composition is sintered, may occur, and problems such as lowering of the dielectric constant, lowering of high-temperature withstand voltages manufactured from the dielectric ceramic composition, and the like, may occur.

After mixing the base material powder particle and the diffusion type additive, a step of drying them if necessary may further be included. As described above, when the base material powder particle and the diffusion type additive are wet mixed by manufacturing an aqueous slurry, a process or removing residual water may be needed. A method of the drying is not particularly limited. For example, the drying may be performed using a dehumidifying dryer, a reduced pressure dryer or a hot air dryer, and a temperature during the drying may be in a range of 100° C. to 300° C. or 120° C. to 200° C.

In an example, a manufacturing method of a dielectric ceramic composition according to the present disclosure may include a step of performing heat-treatment the base material powder particle mixed with the diffusion type additive. The heat-treatment may serve to remove the reactive functional group introduced to the surface of the base material powder particle, while the above-described diffusion type additive component forms a base material powder particle and a solid solution to form a coating layer. When the reactive functional group is not removed and remains on the surface of the base material powder particle, a problem in which base material powder particles aggregate each other and do not disperse with each other in a subsequent process may occur.

The heat treatment may be performed at a temperature in a range of 400° C. to 900° C. When the heat treatment temperature is less than of 400° C., the reactive functional group may remain without being removed, and when the heat treatment exceeds 900° C., the base material powder particle itself may be agglomerated. The heat treatment temperature is not particularly limited as long as it is a temperature capable of sufficiently removing the reactive functional group, but may be differently applied according to the particle size, and it is preferable that the smaller the average particle size of the base material powder particle, the higher the heat treatment temperature.

In an example, a manufacturing method of the dielectric ceramic composition according to the present disclosure may include a step of dry grinding heat-treated powder as needed. The dry grinding may be a process of grinding a composition in which heat-treatment is completed to form an aggregate. The grinding may be performed using a hammer mill, a pin mill, or the like, but is not limited thereto.

In an embodiment of the present disclosure, the heat-treated dielectric ceramic composition may be formed with a layer of the afore-mentioned diffusion type additive at a depth of 0.8 nm to 8.5 nm from the surface of the base material powder particle. As described above, in the method of the present disclosure, it is possible to make uniform dispersion through a step of attaching the reactive functional group to the base material powder particle, and dispersing the diffusion type additive first, thereby allowing the first and second subcomponents to be dissolved in a constant depth from the surface of the base material powder particle.

In another embodiment of the present disclosure, the manufacturing method of the dielectric ceramic composition according to the present disclosure may further include a step of mixing the heat-treated base material powder particle with the non-diffusion type additive including a third subcomponent. As described above, the third subcomponent may serve to help sintering and to rearrange the base material powder particle and the diffusion type additive.

The present disclosure also relates to a dielectric ceramic composition. The dielectric ceramic composition according to the present disclosure may include: a base material powder particle having a perovskite structure; and a diffusion type additive. A concentration peak layer of the diffusion type additive may be present at a depth of 0.8 nm to 8.5 nm from the surface of the base material powder particle. In one example, in a depth range of 0.8 nm to 8.5 nm from the surface of the base material powder particle, a mass concentration of the diffusion type additive with respect to the base material powder may be 50% or more as compared to the maximum mass ratio of the diffusion type additive with respect to the base material powder. The determination of the depth range, however, is not limited thereto, and may be recognizable by one of ordinary skill in the art.

In an example of the present disclosure, the diffusion type additive may include a first subcomponent including one or more selected from a group consisting Y, Dy, Ho, Er, Gd, Ce, Nd, Sm, Tb, Tm, La, Yb, oxides thereof and carbonates thereof.

In another example of the present disclosure, the diffusion type additive may include three or more of a second subcomponent including one or more selected from a group consisting of Mg, Li, Ti, Cr, Mn, Fe, Co, Ni, Cu, Zn, Sr, Zr, Ru, Rh, Pd, Ag, Cd, In, Sn, Sb, Ta, W, Pb, Bi, V, Nb, B, oxides thereof and carbonates thereof.

In one example, the dielectric ceramic composition according to the present disclosure may have an average particle diameter (D50) in a range of 100 nm to 500 nm. In the present specification, the particle diameter (D50) may be obtained by taking an image using a scanning electron microscope (SEM, JSM-7400F of Jeol, Inc) and then calculating a particle diameter by an average of a long axis and a short axis of the composition particles using an image analysis program (ImagePro Plus ver 4.5 of Mediacybernetics, Inc.), and the average particle diameter (D50) may be obtained on a basis of the particle diameter thereof, and may be an average value of 500 measurements. The particle diameter (D50) may be measured in a different way and/or by a different tool appreciated by one skilled in the art. In the present specification, D50 may mean a particle size corresponding to 50% of a total volume when a volume is accumulated from the small particles by measuring the particle diameter.

Since the description of the base material powder particle, the first subcomponent, the second subcomponent, and the like is the same as described above, a description thereof will be omitted.

Hereinafter, the present disclosure will be described in more detail with reference to Experimental Examples. However, the scope of the present disclosure is not limited by Experimental Example.

Experimental Example

A hydroxyl group was attached to barium titanate (BaTiO$_3$), the base material powder particle, using a reactive functional group. The hydroxy group was dispersed in barium titanate powder in hydrogen peroxide (H$_2$O$_2$) and attached to the surface of barium titanate. In this case, 200 mL of hydrogen peroxide was used per 10 g of barium titanate powder, and dried it after the surface treatment to obtain a surface-modified barium titanate powder.

The surface-treated barium titanate powder was mixed with pure water using a zirconia ball as a media, and then ball milled to prepare an aqueous barium titanate slurry.

Separately, an aqueous slurry was prepared by mixing the first subcomponent and the second subcomponent with pure water in accordance with a composition ratio of Table 1 below. Thereafter, the aqueous slurry of the first subcomponent and the second subcomponent and the aqueous slurry of barium titanate were mixed by ball milling for 2 hours. The mixed slurry was hot-air dried at a temperature of 150° C., and the dried powder was heat-treated according to the conditions of Table 1 below.

The prepared slurry was prepared as a molded sheet to a thickness of 10 μm using a doctor blade type coater. Ni internal electrode printing was performed on the prepared molded sheet. Upper and lower covers were manufactured by stacking 25 layers of cover sheets, and a bar was manufactured by pressing and stacking 21 layers of printed active sheets. The pressing bar was cut into chips having a size of 3.2 mm×1.6 mm using a cutter.

The manufactured 3216-sized chips were calcined and then fired at a temperature of 1200 to 1250° C. for 2 hours in a reducing atmosphere of 1.0% H$_2$/99.0% N$_2$ (H$_2$O/H$_2$/N$_2$ atmosphere), and was subjected to heat treatment by performing reoxidation for 3 hours at 1000° C. in a N$_2$ atmosphere. An external electrode was completed through a termination process and an electrode firing process with a Cu paste on the fired chip.

In Table 1, a method in which barium titanate, a base material powder particle is surface treated and the first subcomponent and the second subcomponent are coated by heat treatment was described as an example. A method in which subcomponents are mixed at a time by a conventional method was described as a comparative example.

The dielectric constant, DF, BDV, MTTF, and the like, of the prototype multilayer ceramic capacitor (Proto-type MLCC) specimens completed as described above were evaluated.

| ADDITIVE COMPONENT | MAIN COM- PONENT BaTO$_3$ | FIRST COM- PONENT Dy$_2$O$_3$ | SECOND SUBCOMPONENT MgCO$_3$ | SECOND SUBCOMPONENT Mn$_3$O$_4$ | SECOND SUBCOMPONENT Cr$_2$O$_3$ | THIRD SUB- COMPONENT SiO$_2$ | THIRD SUB- COMPONENT BaCO$_3$ | AMOUNT OF H$_2$O$_2$ PER 10 G OF BaTiO$_3$ (mL) |
|---|---|---|---|---|---|---|---|---|
| COMPARATIVE EXAMPLE 1 | 100 | 0.5 | 0.5 | 0.3 | 0.3 | 1.5 | 1.0 | X |
| COMPARATIVE EXAMPLE 2 | | 1.0 | 0.5 | 0.3 | 0.3 | 1.5 | 1.0 | X |
| COMPARATIVE EXAMPLE 3 | | 1.5 | 0.5 | 0.3 | 0.3 | 1.5 | 1.0 | X |
| COMPARATIVE EXAMPLE 4 | | 2.0 | 0.5 | 0.3 | 0.3 | 1.5 | 1.0 | X |
| COMPARATIVE EXAMPLE 5 | | 2.5 | 0.5 | 0.3 | 0.3 | 1.5 | 1.0 | X |
| EXAMPLE 1 | | 2.0 | 0.1 | 0.3 | 0.3 | 1.5 | 1.0 | X |
| EXAMPLE 2 | | 2.0 | 0.25 | 0.3 | 0.3 | 1.5 | 1.0 | X |
| EXAMPLE 3 | | 2.0 | 0.5 | 0.3 | 0.3 | 1.5 | 1.0 | X |
| EXAMPLE 4 | | 2.0 | 0.75 | 0.3 | 0.3 | 1.5 | 1.0 | X |
| EXAMPLE 5 | | 2.0 | 1.0 | 0.3 | 0.3 | 1.5 | 1.0 | X |
| EXAMPLE 6 | | 2.0 | 0.75 | 0.1 | 0.3 | 1.5 | 1.0 | X |
| EXAMPLE 7 | | 2.0 | 0.75 | 0.2 | 0.3 | 1.5 | 1.0 | X |
| EXAMPLE 8 | | 2.0 | 0.75 | 0.3 | 0.3 | 1.5 | 1.0 | X |
| EXAMPLE 9 | | 2.0 | 0.75 | 0.4 | 0.3 | 1.5 | 1.0 | X |
| EXAMPLE 10 | | 2.0 | 0.75 | 0.5 | 0.3 | 1.5 | 1.0 | X |
| EXAMPLE 11 | | 2.0 | 0.75 | 0.3 | 0.1 | 1.5 | 1.0 | X |
| EXAMPLE 12 | | 2.0 | 0.75 | 0.3 | 0.2 | 1.5 | 1.0 | X |
| EXAMPLE 13 | | 2.0 | 0.75 | 0.3 | 0.3 | 1.5 | 1.0 | X |
| EXAMPLE 14 | | 2.0 | 0.75 | 0.3 | 0.4 | 1.5 | 1.0 | X |
| EXAMPLE 15 | | 2.0 | 0.75 | 0.3 | 0.5 | 1.5 | 1.0 | X |
| EXAMPLE 16 | | 2.0 | 0.75 | 0.3 | 0.2 | 1.5 | 1.0 | 100 |
| EXAMPLE 17 | | 2.0 | 0.75 | 0.3 | 0.2 | 1.5 | 1.0 | X |
| EXAMPLE 18 | | 2.0 | 0.75 | 0.3 | 0.2 | 1.5 | 1.0 | X |
| EXAMPLE 19 | | 2.0 | 0.75 | 0.3 | 0.5 | 1.5 | 1.0 | X |
| EXAMPLE 20 | | 2.0 | 0.75 | 0.3 | 0.2 | 1.5 | 1.0 | X |
| EXAMPLE 21 | | 2.0 | 0.75 | 0.3 | 0.2 | 1.5 | 1.0 | X |
| EXAMPLE 22 | | 2.0 | 0.75 | 0.3 | 0.2 | 1.5 | 1.0 | 100 |
| EXAMPLE 23 | | 2.0 | 0.75 | 0.3 | 0.5 | 1.5 | 1.0 | 150 |
| EXAMPLE 24 | | 2.0 | 0.75 | 0.3 | 0.2 | 1.5 | 1.0 | 200 |
| EXAMPLE 25 | | 2.0 | 0.75 | 0.3 | 0.2 | 1.5 | 1.0 | 250 |
| EXAMPLE 26 | | 2.0 | 0.75 | 0.3 | 0.2 | 1.5 | 1.0 | 100 |
| EXAMPLE 27 | | 2.0 | 0.75 | 0.3 | 0.5 | 1.5 | 1.0 | 150 |
| EXAMPLE 28 | | 2.0 | 0.75 | 0.3 | 0.2 | 1.5 | 1.0 | 200 |
| EXAMPLE 29 | | 2.0 | 0.75 | 0.3 | 0.2 | 1.5 | 1.0 | 250 |

| ADDITIVE COMPONENT | HEAT TREATMENT TEMPERATURE (° C.) | PERMITIVITY | DF(%) | BDV Max-Min (V/μ) | ADDITIVE SOLID SOLUBILITY (nm) | MITF (hr) | COMPREHENSIVE EVALUATION |
|---|---|---|---|---|---|---|---|
| COMPARATIVE EXAMPLE 1 | X | 3401 | 2.8 | 132 | 0.9 | 124 | X |
| COMPARATIVE EXAMPLE 2 | X | 3340 | 2.7 | 125 | 1.0 | 140 | X |
| COMPARATIVE EXAMPLE 3 | X | 3317 | 2.4 | 118 | 0.8 | 151 | Δ |
| COMPARATIVE EXAMPLE 4 | X | 3278 | 2.0 | 110 | 1.0 | 163 | Δ |
| COMPARATIVE EXAMPLE 5 | X | 3231 | 1.7 | 113 | 0.9 | 157 | Δ |
| EXAMPLE 1 | X | 3362 | 2.7 | 131 | 1.0 | 134 | X |
| EXAMPLE 2 | X | 3305 | 2.4 | 119 | 0.8 | 154 | Δ |
| EXAMPLE 3 | X | 3278 | 2.0 | 110 | 1.1 | 163 | Δ |
| EXAMPLE 4 | X | 3213 | 1.8 | 102 | 1.2 | 186 | Δ |
| EXAMPLE 5 | X | 3137 | 1.4 | 105 | 1.0 | 171 | Δ |
| EXAMPLE 6 | X | 3328 | 2.8 | 137 | 1.0 | 124 | X |
| EXAMPLE 7 | X | 3271 | 2.1 | 118 | 1.1 | 151 | Δ |
| EXAMPLE 8 | X | 3213 | 1.8 | 102 | 1.2 | 186 | Δ |
| EXAMPLE 9 | X | 3154 | 1.6 | 108 | 0.9 | 159 | Δ |
| EXAMPLE 10 | X | 3109 | 1.3 | 120 | 1.0 | 145 | X |
| EXAMPLE 11 | X | 3294 | 2.5 | 101 | 1.0 | 190 | Δ |
| EXAMPLE 12 | X | 3240 | 2.3 | 95 | 1.1 | 204 | Δ |
| EXAMPLE 13 | X | 3213 | 1.8 | 102 | 1.2 | 186 | Δ |

-continued

| | | | | | | | |
|---|---|---|---|---|---|---|---|
| EXAMPLE 14 | X | 3196 | 1.6 | 111 | 1.0 | 160 | Δ |
| EXAMPLE 15 | X | 3152 | 1.6 | 127 | 1.0 | 134 | X |
| EXAMPLE 16 | X | 4820 | 12.7 | 5 | 1.4 | 12 | X |
| EXAMPLE 17 | 400 | 3229 | 2.0 | 89 | 2.1 | 223 | Δ |
| EXAMPLE 18 | 500 | 3225 | 2.0 | 83 | 3.4 | 236 | Δ |
| EXAMPLE 19 | 600 | 3224 | 1.9 | 78 | 4.1 | 251 | ○ |
| EXAMPLE 20 | 700 | 3225 | 2.0 | 71 | 5.2 | 274 | ○ |
| EXAMPLE 21 | 800 | 3701 | 7.1 | 154 | 6.3 | 108 | X |
| EXAMPLE 22 | 600 | 3214 | 2.0 | 66 | 6.0 | 381 | ○ |
| EXAMPLE 23 | 600 | 3201 | 2.0 | 48 | 6.6 | 498 | ○ |
| EXAMPLE 24 | 600 | 3189 | 2.1 | 41 | 7.2 | 614 | ⊚ |
| EXAMPLE 25 | 600 | 3180 | 2.0 | 44 | 7.0 | 605 | ⊚ |
| EXAMPLE 26 | 700 | 3217 | 2.0 | 50 | 7.0 | 402 | ○ |
| EXAMPLE 27 | 700 | 3203 | 2.0 | 33 | 7.3 | 516 | ○ |
| EXAMPLE 28 | 700 | 3196 | 2.0 | 26 | 8.1 | 647 | ⊚ |
| EXAMPLE 29 | 700 | 3192 | 2.1 | 28 | 8.0 | 640 | ⊚ |

In Table 1 above, a dielectric constant, a dissipation factor (DF), and a mean time to failure (MTTF) were measured at 1 kHz, AC 0.2V/μm using an LCR meter. The measurement, however, is not limited thereto, and may be performed in a different way appreciated by one skilled in the art.

In addition, breakdown voltage (BDV) characteristics were represented by a difference between a maximum voltage and a minimum voltage per a unit thickness, an additive solid solubility was measured in a direction, perpendicular to a grain boundary based on a point where a Dy content was ½% of a maximum value by mass % on the surface of the barium titanate powder, and the surface of the barium titanate powder was based on a point where the Ba content is ½ of the maximum value. The measurement of the breakdown voltage (BDV) characteristics is not limited thereto, and may be performed in a different way appreciated by one skilled in the art.

Looking at Comparative Examples 1 to 5, Examples 1 to 15, and 17 to 21 that do not perform surface treatment, it can be confirmed that DF and high temperature withstand voltage characteristics are lowered. In addition, referring to Example 16 in which the base material powder particle was surface treated but not subjected to heat treatment, it can be confirmed that MTTF for evaluating the reliability of the electronic component is significantly reduced.

In addition, under the heat-treatment temperature of 400° C. or less, since decomposition of an organic matter and a removal of a hydroxyl group on the surface of the barium titanate powder are not sufficiently performed, there is an expected side effect, and it was confirmed when the heat treatment temperature was 800° C. or more, an improvement effect of withstand voltage characteristics was halved due to an increase in a coarse fraction by a particle coupling between the barium titanates and an increase in the particle size.

On the other hand, in Examples 22 to 29 in which the surface of the barium titanate powder was modified with a hydroxyl group and the heat-treatment was completed, it can be confirmed that reliability, in particular, high-temperature (150° C.) withstand voltage characteristics are improved while showing low DF, and excellent dielectric constant and BDV.

Figure 5:
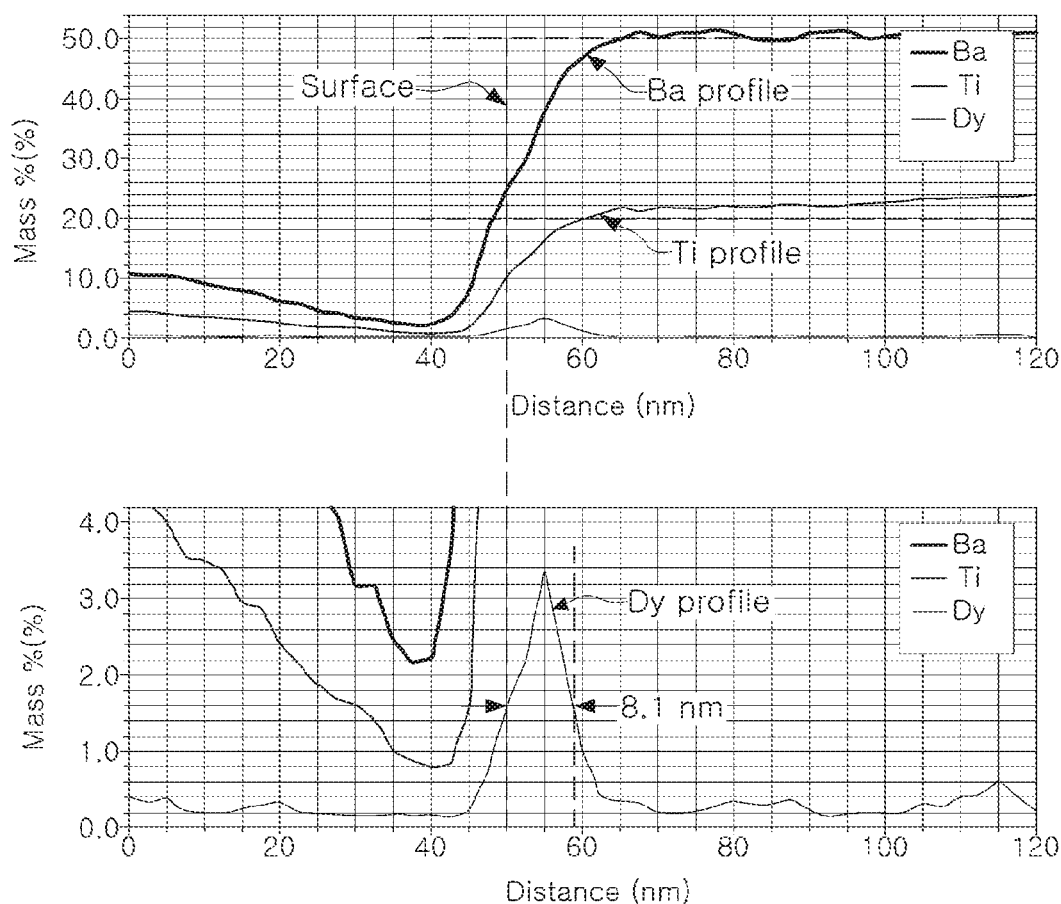
FIG. 5 is a graph illustrating results of TEM analysis of the dielectric ceramic composition according to an embodiment of the present disclosure.

FIG. 5 is a TEM analysis photograph of a dielectric ceramic composition after a heat-treatment according to an embodiment of the present disclosure is completed. Referring to FIG. 5, as a result that barium titanate is used as a base material powder particle and dysprosium (Dy) is used as the diffusion-type additive to solid solution in the base material powder particle, it can be confirmed that a layer of dysprosium is formed evenly at a depth of about 8.1 nm from the surface of the base material powder particle.

As set forth above, according to an embodiment of the present disclosure, a manufacturing method of a dielectric ceramic composition and a dielectric ceramic composition capable of uniformly dispersing subcomponents may be provided.

According to another embodiment of the present disclosure, a manufacturing method of a dielectric ceramic composition and a dielectric ceramic composition having a uniform concentration gradient up to a final powder manufactured by improving dispersion stability may be provided.

According to another embodiment of the present disclosure, a manufacturing method of a dielectric ceramic composition and a dielectric ceramic composition having excellent electrical properties such as a dielectric constant and a high-temperature withstand voltage by making solid solubility of the subcomponent uniform.

However, various and advantageous advantages and effects of the present disclosure are not limited to the above description, and will be more readily understood in the process of describing specific embodiments of the present disclosure.

While this disclosure includes specific examples, it will be apparent to one of ordinary skill in the art that various changes in form and details may be made in these examples without departing from the spirit and scope of the claims and their equivalents.

What is claimed is:

1. A dielectric ceramic composition, comprising:

a base material powder particle of a perovskite structure; and a diffusion type additive, wherein a concentration peak layer of the diffusion type additive is present at a depth of 0.8 nm to 8.5 nm from a surface of the base material powder particle, and wherein the diffusion type additive comprises a first subcomponent including one or more selected from a group consisting of Y, Dy, Ho, Er, Gd, Ce, Nd, Sm, Tb, Tm, La, Gd, Yb, oxides thereof, and carbonates thereof, and wherein an average particle diameter (D50) of the dielectric ceramic composition is in a range of 100 nm to 500 nm.

2. The dielectric ceramic composition of claim 1, wherein the diffusion type additive comprises three or more of a second subcomponent including one or more selected from a group consisting of Mg, Li, Ti, Cr, Mn, Fe, Co, Ni, Cu, Zn, Sr, Zr, Ru, Rh, Pd, Ag, Cd, In, Sn, Sb, Ta, W, Pb, Bi, V, Nb, B, oxides thereof, and carbonates thereof.

* * * * *